J. C. POORMAN.
CLOTHES LINE REEL.
APPLICATION FILED JAN. 7, 1910.
972,238.
Patented Oct. 11, 1910.
2 SHEETS—SHEET 1.
Fig. I.
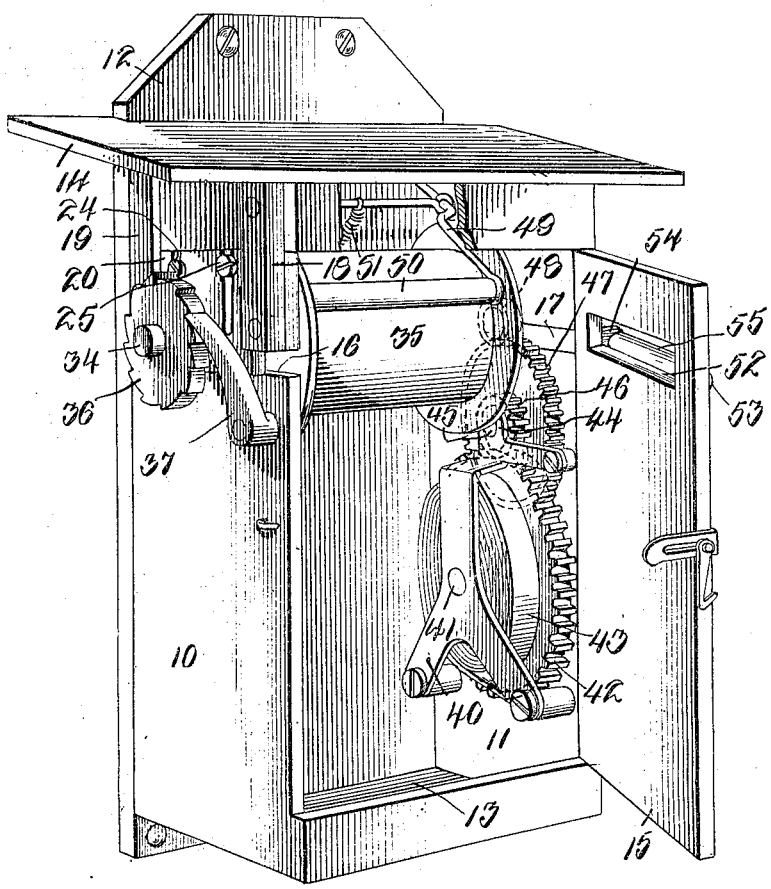
Inventor
John C. Poorman.
Witnesses
By 
Attorneys

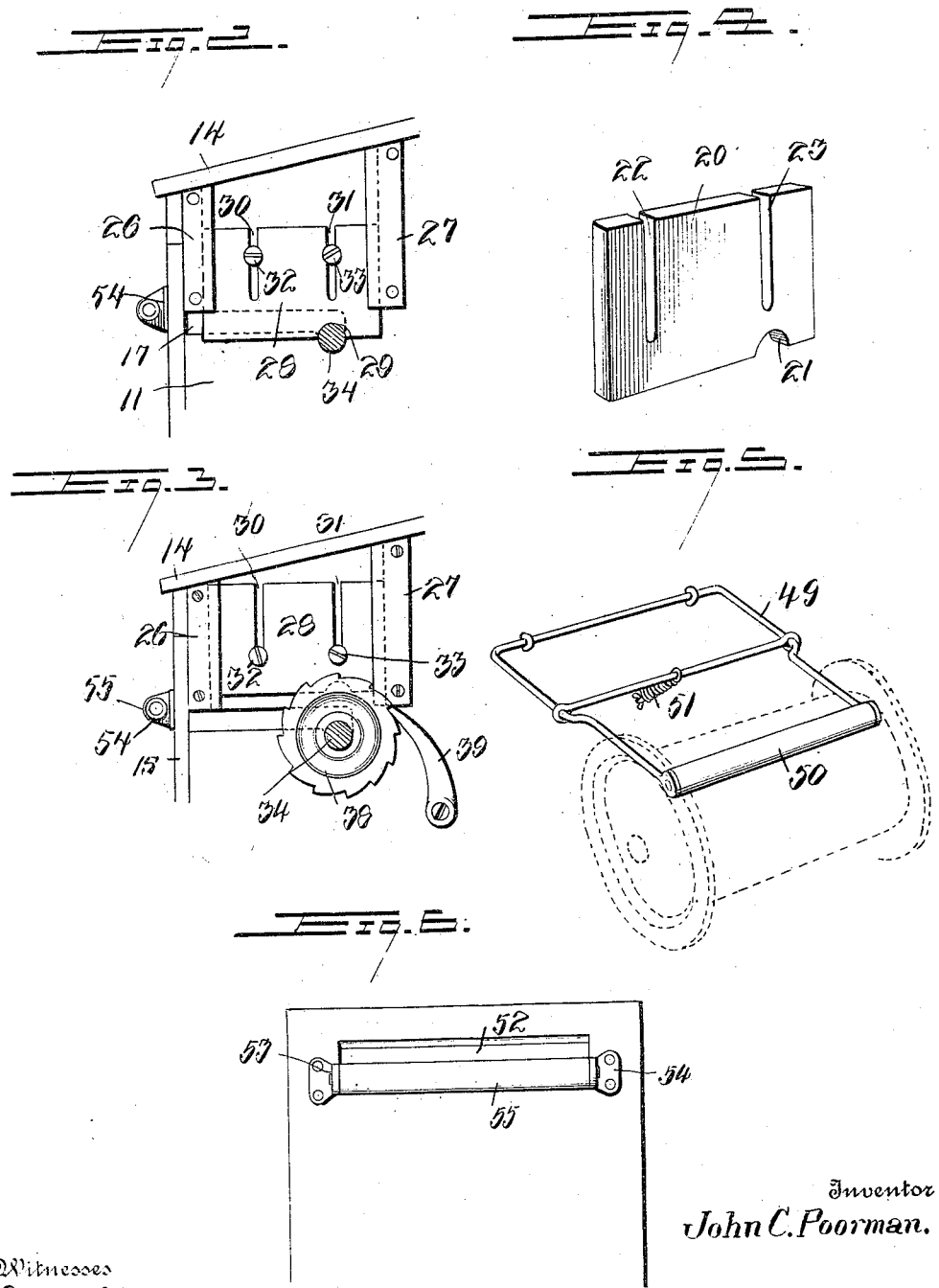

UNITED STATES PATENT OFFICE.

JOHN C. POORMAN, OF SUMMERHILL, PENNSYLVANIA, ASSIGNOR OF ONE-THIRD TO IRWIN M. OLDHAM, OF PORTAGE, PENNSYLVANIA.

CLOTHES-LINE REEL.

972,238.  Specification of Letters Patent.  Patented Oct. 11, 1910.

Application filed January 7, 1910. Serial No. 536,833.

*To all whom it may concern:*

Be it known that I, JOHN C. POORMAN, a citizen of the United States, residing at Summerhill, in the county of Cambria, State of Pennsylvania, have invented certain new and useful Improvements in Clothes-Line Reels; and I do hereby declare the following to be a full, clear, and exact description of the invention, such as will enable others skilled in the art to which it appertains to make and use the same.

This invention relates to clothes line reels.

The object of the invention resides in the construction of a device in which the clothes line when not in use will be inclosed within a casing to protect the same from the weather, and further aims to provide means whereby the clothes line will be automatically wound upon a spool or reel within the casing when the outer end of the same has been unfastened.

Another object of the invention resides in providing means whereby the reel and the shaft upon which same is mounted may be easily and readily removed from its bearings for the purpose of effecting repairs necessitated by damage due to accident or wear.

A still further object of the invention resides in providing means whereby the spool or reel may be locked against rotation in either direction for the purpose of preventing the actuation of the automatic winding means, and to permit force to be applied to the clothes line for the purpose of stretching the same without producing a resultant rotation of the reel.

With the above and other objects in view the invention consists in the details of construction and in the arrangement and combination of parts to be hereinafter more fully described and set forth in the claims.

In describing the invention in detail reference will be had to the accompanying drawings in which like characters of reference denote corresponding parts in the several views, and in which, Figure 1 is a perspective view of a device constructed in accordance with the invention, a portion of the casing being broken away and the door thereof swung open to expose to view the mechanism contained within the casing; Fig. 2, a fragmental side view of the device viewed from the right, the pawl and ratchet mechanism for locking the reel against rotation under the influence of the automatic winding means being removed; Fig. 3, a view similar to Fig. 2 with the pawl and ratchet mechanism for locking the reel against the influence of the automatic winding means illustrated; Fig. 4, a detail perspective view of one of the adjustable bearing plates which secure the shaft and reel against bodily removal from the casing; Fig. 5, a detail perspective view of the device for effecting an even winding of the line upon the reel; the latter being shown in dotted lines; and, Fig. 6 a fragmental detail view of the door of the casing showing the slot therein and the anti-friction roller disposed there beneath upon which the line travels in its movement through said slot.

Referring to the drawings, the device is shown as comprising a casing formed of the sides 10 and 11, back 12, bottom 13 and top 14; the front of said casing being opened and closed through the instrumentality of a hinged door 15. The back 12 of the casing projects at each end beyond the top and bottom members 13 and 14 and is adapted to be secured directly to a wall or other suitable support through the medium of securing devices passed through the extending portions thereof. The top 14 is inclined with respect to the longitudinal axis of the side members 10 and 11 and projects at its front and side edges beyond the front and side members of the casing to effectually prevent the entrance of water into the interior of the casing. Each of the side members 10 and 11 is provided with corresponding horizontally disposed slots 16 and 17 respectively, the lower wall of each of said slots being provided at its extreme inner end with a semi-circular recess for a purpose to be presently described.

Disposed above the slot 16 in the side 10 and extending longitudinally thereof are the spaced guide rails 18 and 19 between which is mounted for a sliding movement a bearing plate 20 which has formed in its lower edge a semi-circular recess 21 corresponding to the recess in the lower wall of the slot 16 and in vertical alinement therewith so that when said bearing plate 20 is moved toward said slot the recess in the lower wall of the slot 16 and the recess 21 in said plate will form jointly a shaft bearing. The plate 20 is further provided with the vertical slots 22 and 23 in parallel spacement and extending through the upper edge thereof, adapted to receive respectively the shanks of set screws 24 and 25, said screws being mounted in the side member 10 and positioned in vertical alinement with the slots 22 and 23. By this construction it will be apparent that the plate 20 can be adjusted vertically in the guide rails 18 and 19 and held in any adjusted position by the set screws 24 and 25.

Mounted on the outer face of the side member 11 of the casing above the slot 17 are spaced guide rails 26 and 27 corresponding to the guide rails 18 and 19, while a bearing plate 28, similar to the bearing plate 20 is mounted for vertical movement between said guide rails and has formed in its lower edge a recess 29 disposed in vertical alinement with a corresponding recess at the inner end of the lower wall of the slot 17 to effect a shaft bearing similar to that formed by the recess 21 of the plate 20 and the recesses at the inner end of the lower wall of the slot 16. Likewise the plate 28 is provided with vertically disposed slots 30 and 31 corresponding to the slots 22 and 23 of the plate 20 which receive the shanks of the set screws 32 and 33 respectively which are mounted in the side member 11 and through the instrumentality of which the plate 28 may be moved in the guide rails 26 and 27 and locked in any desired position.

Journaled in the bearings formed by the recess in the lower wall of the slots 16 and 17 and in the lower edges of the plates 20 and 28 is a shaft 34 which has fixed thereon between the side members 10 and 11 a reel 35 upon which the clothes line is adapted to be wound and unwound, said shaft being positioned in its bearings by insertion in the slots 16 and 17 after which it is moved toward the back of the casing until the terminals of same enter the recesses at the ends of the rear wall of the slots 16 and 17. The plates 20 and 28 are then moved downward until the recesses 21 and 29 in the lower faces thereof, respectively, partially encircle said shaft, when said plates are then locked against movement in their respective guide rails by turning the set screws 24, 25 and 32, 33.

To lock the reel 35 against rotation when a sufficient quantity of line has been unwound therefrom and thus permit the free line to be drawn taut without rotating the reel, a ratchet wheel 36 is fixed on the left end of the shaft 34 which projects beyond the side member 10 and a pawl 37 adapted for engagement with said ratchet wheel 36 is pivotally mounted on the outer face of said side member. From this construction it will be apparent that when the pawl 37 is in engagement with the ratchet wheel 36 rotation of the reel 35 in a direction to unwind the line therefrom is impossible. In order to lock the reel against rotation under the influence of the automatic winding mechanism to be presently described, the right end of the shaft 34 which projects beyond the side member 11 has mounted thereon a ratchet wheel 38, the teeth of which are disposed oppositely to the teeth of the ratchet wheel 36. A pawl 39 is pivotally mounted on the side member 11 and is adapted for engagement with the teeth of the wheel 38 to effect the locking of the reel against rotation under the influence of the automatic winding mechanism. The pawls 37 and 39 may be in simultaneous engagement with the ratchet wheels 36 and 38 respectively but only one or neither may be in engagement with its respective ratchet wheel as the circumstances may demand.

Mounted on the inner face of the side member 11 in parallel spacement therewith is a plate 40 and journaled between said plate and the side member 11 is a shaft 41. Mounted upon said shaft is a gear wheel 42, while a spring 43 of the ordinary clock type encircles the shaft and has one end fixed thereto while its other end is fixed to the gear wheel 42. Journaled between the side member 11 and a projecting ear 44 of the plate 40 is another shaft 45 which has mounted thereon a pinion 46 in mesh with the gear 42 and also a gear 47, the latter in turn meshing with a gear 48 mounted on the shaft 34 between one end of the reel 35 and the side member 11. From this construction it will be apparent that when the reel 35 is rotated by the removal of the line therefrom a corresponding rotation of the shaft 34 will take place, which by reason of the engagement between the gears 48, 47, pinion 46 and gear 42 will wind up the spring 43 and when the end of the line which has been removed from the reel is released the energization of the spring 42 will effect a rotation of the reel 35 and rewind the line thereon.

To effect an even winding and unwinding upon the reel 35 there is pivotally connected to the back 12 of the casing a frame 49 which has journaled between the sides thereof a roller 50, the position of said frame being such that when the free end thereof is moved downward the roller 50 will move into contact with the periphery of the reel 35. A spring 51 having one end secured to a part of the frame 49 and its other end to the back member 12 of the casing serves to positively hold the roller 50 in engagement with the periphery of the wheel 35; such positive engagement effecting an even winding and unwinding of the line upon and from the reel.

The door 15 of the casing is provided at its upper end with a transversely disposed slot 52 through which the line is adapted to pass in its travel to and from the reel Mounted on the outer face of said door at each end of the slot 52 are a pair of brackets 53 and 54 between which is journaled an anti-friction roller 55, the upper longitudinal edge of which is disposed slightly above the lower edge of the slot 52 so that the line in its travel to and from the reel will rest upon said roller and thus lessen the wear thereon.

While one particular form of the device has been described in detail it will be noted that various changes in the details of construction may be resorted to without departing from the spirit of the invention or scope of the appended claims.

What is claimed is:—

1. A clothes line reel comprising a casing having its sides correspondingly slotted and opening through one edge thereof, said slots having like recesses formed in corresponding walls, a shaft mounted in said recesses, a locking plate slidably mounted on each side of the casing and provided with a recess in its lower edge adapted to receive and hold the shaft against bodily movement in the slots in the sides of the casing, and a reel fixed on said shaft.

2. A clothes line reel comprising a casing having its sides correspondingly slotted and opening through one edge thereof, a shaft having its respective terminals mounted in said slots, a pair of guide rails mounted on each side of the casing, a locking plate slidably mounted in said guide rails and adapted to be moved into engagement with the shaft to secure the latter against bodily movement in the slot in which it is mounted, means for securing said locking plates in adjusted position with respect to the guide rails, and a reel fixed on said shaft.

3. A clothes line reel comprising a casing having its sides correspondingly slotted and opening through one edge thereof, a shaft having its respective terminals mounted in said slots, a pair of guide rails on each side of the casing, a locking plate slidably mounted between each pair of guide rails and adapted to be moved into engagement with the shaft to hold same against bodily movement in the slots in which it is mounted, each of said locking plates having a slot formed therein and opening through one edge thereof, a set screw mounted in each side of the casing and extending through said slots whereby the locking plate may be secured in any adjusted position with relation to the guide rails, and a reel fixed on said shaft.

In testimony whereof, I affix my signature, in presence of two witnesses.

JOHN C. POORMAN.

Witnesses:
 FRANK POORMAN.
 I. M. OLDHAM.